United States Patent
Schipper et al.

[11] Patent Number: 6,114,988
[45] Date of Patent: Sep. 5, 2000

[54] GPS RECEIVER FAULT DETECTION METHOD AND SYSTEM

[75] Inventors: Brian W. Schipper, Brooklyn Park; Suneel I. Sheikh, Minneapolis; Lawrence C. Vallot, Shoreview, all of Minn.

[73] Assignee: Honeywell Inc., Minneapolis, Minn.

[21] Appl. No.: 08/775,508

[22] Filed: Dec. 31, 1996

[51] Int. Cl.[7] .................. G01S 5/02; H04B 7/185
[52] U.S. Cl. .................. 342/357; 701/213; 455/121
[58] Field of Search ..................... 342/352, 357; 455/12.1; 701/213, 215

[56] References Cited

U.S. PATENT DOCUMENTS

| | | | |
|---|---|---|---|
| 4,384,293 | 5/1983 | Deem et al. | 343/113 R |
| 4,719,469 | 1/1988 | Beier et al. | 342/434 |
| 4,963,889 | 10/1990 | Hatch | 342/357 |
| 5,021,792 | 6/1991 | Hwang | 342/357 |
| 5,072,227 | 12/1991 | Hatch | 342/357 |
| 5,119,101 | 6/1992 | Barnard | 342/357 |
| 5,184,304 | 2/1993 | Huddle | 364/453 |
| 5,185,610 | 2/1993 | Ward et al. | 342/357 |
| 5,534,875 | 7/1996 | Diefes . | |
| 5,543,804 | 8/1996 | Buchler et al. | 342/357 |
| 5,548,293 | 8/1996 | Cohen . | |
| 5,561,432 | 10/1996 | Kight . | |
| 5,610,616 | 3/1997 | Vallot et al. | 342/357 |
| 5,631,656 | 5/1997 | Hartman et al. | 342/357 |

Primary Examiner—Thomas Tarcza
Assistant Examiner—Dao L. Phan
Attorney, Agent, or Firm—John G. Shudy, Jr.

[57] ABSTRACT

A GPS receiver fault detection method for use in a GPS attitude determination system having Q Receivers, wherein Q>3, includes providing R attitude solutions using subsets of P Receivers and signals from two or more space vehicles, wherein $3 \leq P \leq Q-1$. Post-update measurement residual sets equal to the number R of attitude solutions are determined. Each of the post-update measurement residual sets corresponds to one of the attitude solutions. "S" Receiver faults are detected by comparing the R post-update measurement residual sets, wherein $1 \leq S \leq Q-3$. A faulty Receiver detection system for carrying out the method is also described.

17 Claims, 3 Drawing Sheets

GPS RECEIVER FAULT DETECTION METHOD AND SYSTEM

FIELD OF THE INVENTION

The present invention relates to GPS attitude determination systems. more particularly, the present invention relates to the detection of faulty receivers in a GPS attitude determination system.

BACKGROUND OF THE INVENTION

Generally, the Global Positioning System (GPS) provides basically two fundamental quantities from each available GPS satellite, e.g., space vehicle (SV). These two fundamental quantities include a pseudorange measurement and SV position. While GPS, itself, is commonly thought of as a position determination system, measurements using GPS signals are actually processed to compute delta positions, i.e., a change or difference in one position with respect to a second position. Such computations are made after receipt of GPS signals from one or more GPS SVs by one or more GPS antenna/receiver sets. The two positions may be, for example, a current position with respect to a previous position, a position of one antenna with respect to another antenna at one particular time (or relative position therebetween), or a current relative position with respect to a previous relative position.

As part of the GPS, each SV continuously transmits a navigation signal, i.e., SV position signal, containing navigation message data such as, for example, time of transmission, satellite clock data, and ephemeris data. The navigation signal is broadcast over two separate carrier signals, denoted as $L_1$ and $L_2$, each of which is modulated by a separate pseudorandom digital code that is unique to the SV from which it is transmitted. For conventional GPS navigation, a GPS receiver typically tracks four SV's, establishing synchronism with its transmitted navigation signal by way of a local clock at the receiver, and recovers the navigation message data.

GPS receivers typically derive two types of measurements from the received GPS signals, referred to as "code measurements" and "carrier measurements." For example, the pseudorandom digital code signals recovered by the GPS receiver can be used to provide code measurements including a measure of the distance to each SV, i.e., pseudorange measurement. This is not necessarily the same as actual range to the SV because of the lack of time clock synchronism between the satellite and the GPS receiver, which can be virtually eliminated by using multiple SV pseudorange measurements to correct for lack of clock synchronism. Further, in contrast to using pseudorandom digital code signals to provide pseudorange measurements, similar measurements may also be recovered using measurements of carrier phase made by the GPS receiver which typically provide for more accurate range measurements. Further, such similar measurements may be made by other methods such as carrier-smoothed code-based pseudorange. In the case of carrier phase based measurements, accurate knowledge of the phase within a single wavelength is available, however, an unknown integral number of carrier signal wavelengths, the phase ambiguity, between a GPS SV and GPS receiver antenna exists, and must be resolved. The resolution of the ambiguity, including the resolution of any clock error between GPS SVs and GPS receivers, is not addressed herein and is assumed to be corrected by one of any number of methods for correcting such ambiguity available in the art.

Typical GPS receivers for tracking a GPS satellite generally require synchronization with and demodulation of the carrier signal and codes from the GPS signals received. In most designs, a correlation process establishes carrier and code tracking loops that align selected GPS carrier and code signals with corresponding replica carrier and code signals generated within the receiver to recover code measurements and carrier measurements.

For illustration, a receiver measures pseudorange, i.e., range from an antenna to an SV, by measuring phase shift between the GPS code signals and the receiver replica code signals. Such phase shift is representative of transit time and therefore a range measurement.

For attitude determination, multiple antenna/receiver sets with the antennas at fixed vehicle body locations are used. Then, differential carrier phase measurements can be made for multiple antennas with respect to a single SV. This differential measurement process eliminates the time effect (attributable to the SV), so that only the relative position effect (attributable to the multiple antennas) remains. For example, by using carrier phase measurements of the GPS signal received from an SV at two antenna/receiver sets, a differential carrier phase measurement representative of the relative position of one of the antennas with respect to the other antenna can be made.

With the use of differential measurements, measuring and processing of the relative position measurements for GPS signals received at three or more noncollinear antennas for at least two GPS SVs are used for the generation of attitude vectors required for providing fill three dimensional attitude determination. For a vehicle having three antennas at fixed locations, the attitude determination using such differential carrier phase measurements represents the attitude of a plane defined by the antennas.

In typical GPS attitude determination systems, such as aircraft, four antenna/receiver sets are utilized for redundancy purposes. Three of the four antennas of the antenna/receiver sets are used to define the plane for which attitude determination can be performed. Many vehicles, particularly manned aircraft, have strict fault detection and isolation requirements placed thereon. Therefore, it is important to be able to detect and isolate faults in antenna/receiver sets of a GPS attitude determination system.

There appear to be no known methods of detecting and isolating a faulty antenna/receiver set in such a GPS attitude determination system. The present invention addresses this problem and others as will be readily apparent to one skilled in the art from the description of the present invention as set forth in detail below.

SUMMARY OF THE INVENTION

A GPS receiver fault detection method in accordance with the present invention for use in a GPS attitude determination system having Q Receivers, wherein Q>3, is described. The method includes providing R attitude solutions using unique subsets of P Receivers and signals from two or more space vehicles, wherein $3 \leq P \leq Q-1$. Post-update measurement residual sets equal to the number R of attitude solutions are determined. Each of the post-update measurement residual sets corresponds to one of the R attitude solutions. "S" Receiver faults are detected by comparing the R post-update measurement residual sets, wherein $1 \leq S \leq Q-3$ In one embodiment of the method, if P is equal to Q−1, and therefore S=1, then the detection step includes identifying a Receiver fault if Q−1 of the R post-update measurement residual sets are relatively different than the other post-update measurement residual set.

In a further embodiment of the method, the comparison of measurement residuals in the detection step to detect at least one faulty receiver is performed only if one of the R post-update measurement residual sets does not meet a residual threshold requirement.

In yet a further embodiment of the method, the GPS attitude determination system has four Receivers and the determination step includes providing four post-update measurement residual sets. Each of the four measurement residual sets corresponds to one of four attitude solutions and each of the attitude solutions is computed using three Receivers. Further, the detection step includes isolating the Receiver fault as the Receiver not used in the computation of the attitude solution corresponding to the post-update measurement residual set which is relatively different than the other three post-update measurement residual sets, i.e., three residual sets are relatively larger than the other residual set.

In another GPS receiver fault detection method in accordance with the present invention for use in a GPS attitude determination system having Q Receivers, wherein Q>3, the method includes providing R attitude solutions using subsets of P Receivers and signals from two or more space vehicles, wherein $3 \leq P \leq Q-1$. Post-update measurement residual values of equal number to the R attitude solutions are determined. Each of the post-update measurement residual values corresponds to one of the R attitude solutions. Each of the R post-update measurement residual values is compared to a measurement residual threshold to determine the potential existence of a faulty Receiver.

A receiver fault detection system in accordance with the present invention for use in determining a Receiver fault during GPS attitude determination is also provided. The system includes Q Receivers for receiving signals from at least two space vehicles, wherein Q>3, and a processing unit for isolating S faulty Receivers, wherein $1 \leq S \leq Q-3$. The processing unit computes R attitude solutions with each of the attitude solutions computed using signals received at unique subsets of P Receivers from the two or more space vehicles, wherein $3 \leq P \leq Q-1$. It calculates R post-update measurement residual values with each of the post-update measurement residual values corresponding to one of the R attitude solutions. The processing unit further compares the R post-update measurement residual values to detect the S faulty Receivers.

DETAILED DESCRIPTION OF THE EMBODIMENTS

Figure 1:
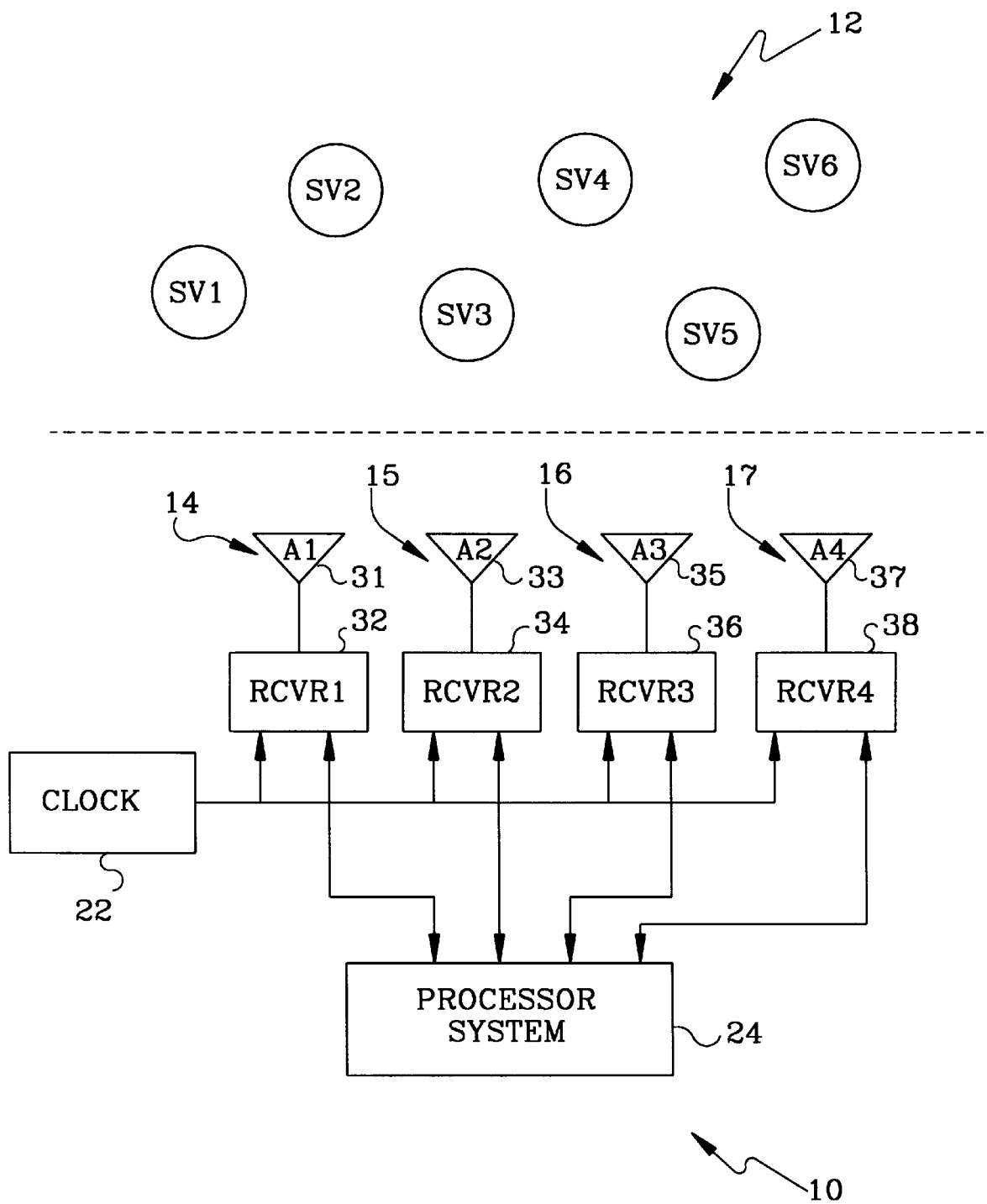
FIG. 1 is a block diagram of a GPS attitude determination system including a processor system for carrying out the present invention; the GPS attitude determination system is shown relative to satellites, i.e., SVs, of the GPS.
Figure 2:
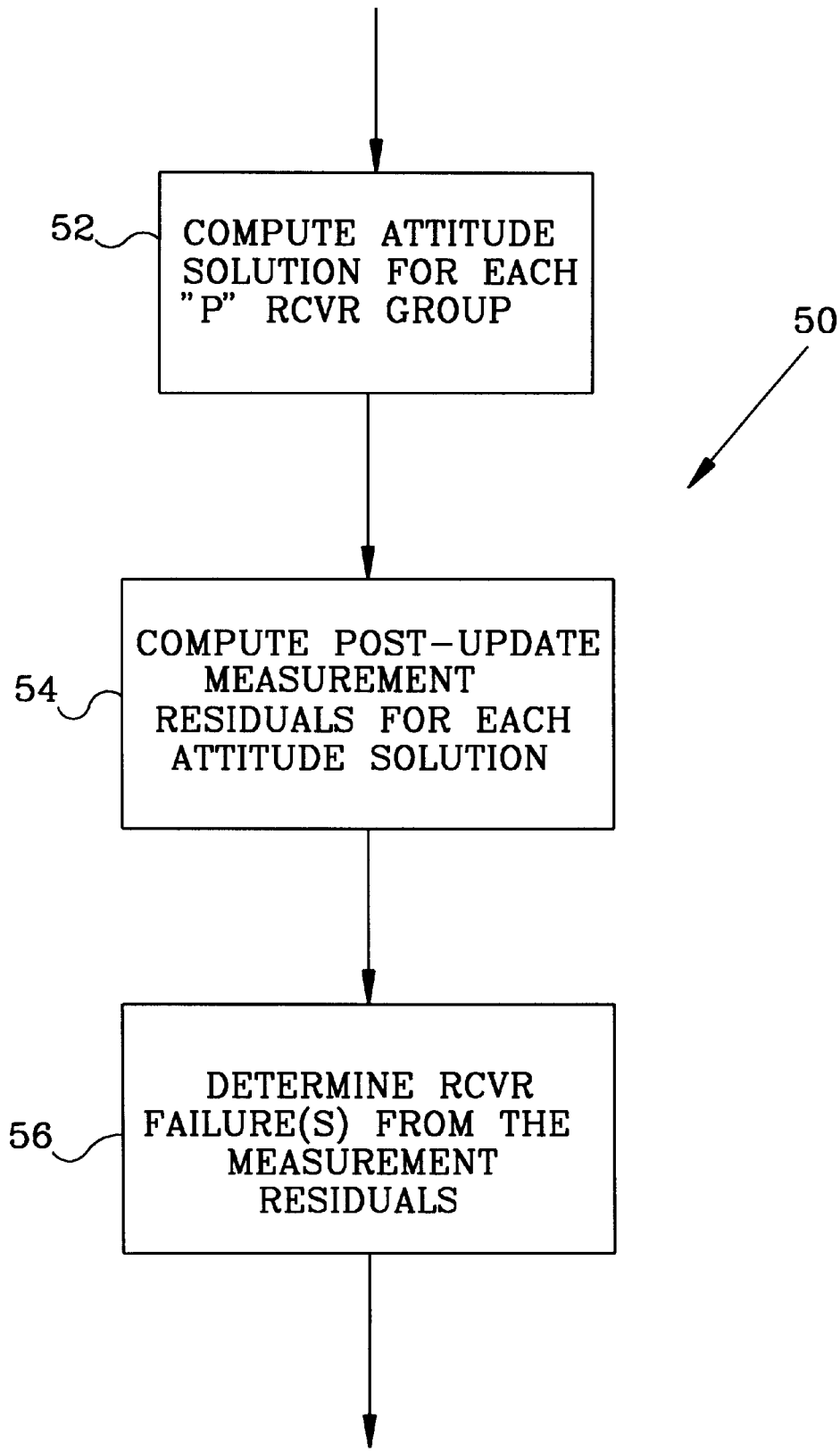
FIG. 2 is a general flow diagram illustrating the detection and isolation method in accordance with the present invention.
Figure 3:
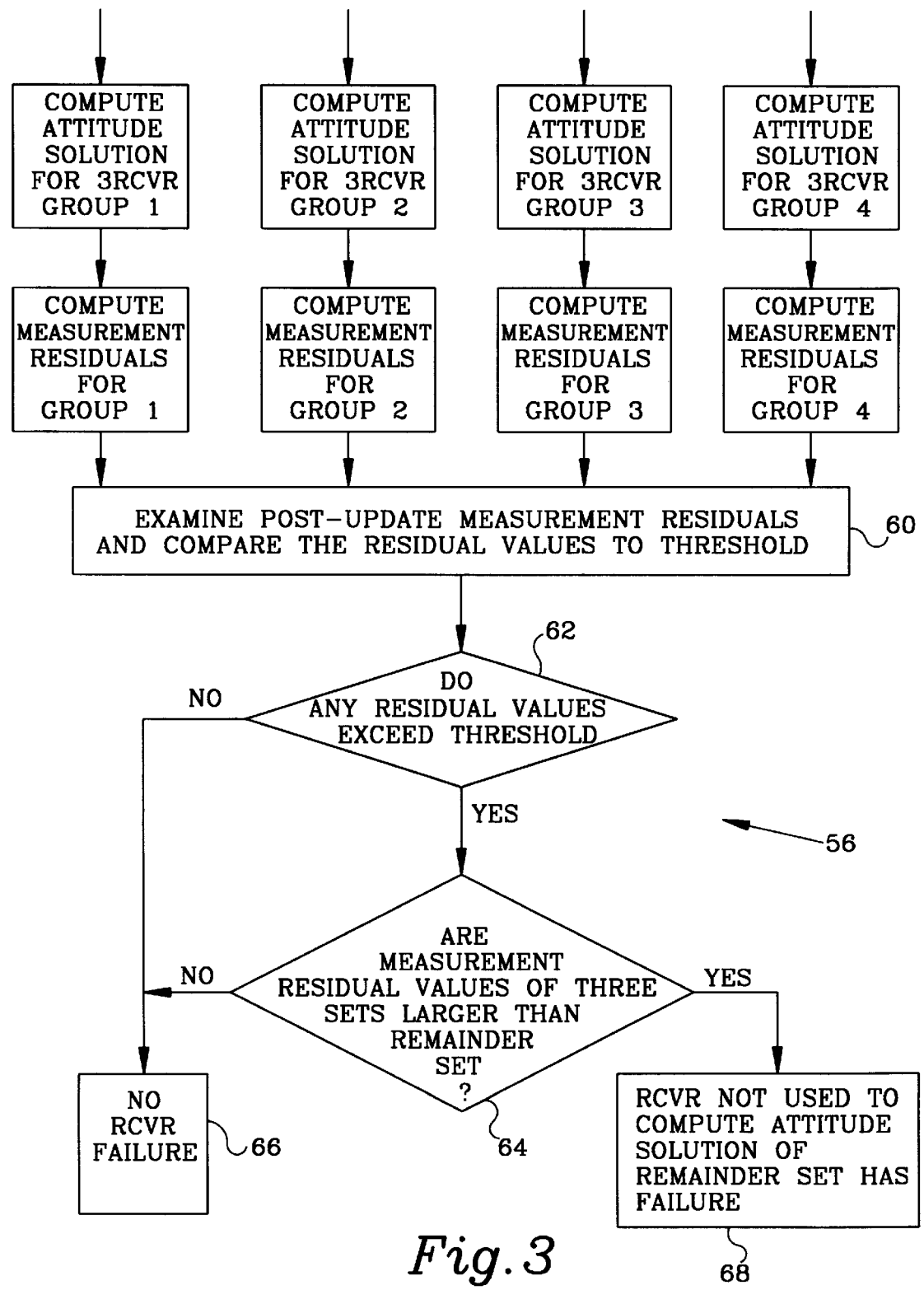
FIG. 3 is a more detailed flow diagram of one illustrative embodiment of the detection and isolation method shown in FIG. 2 for detecting and isolating faults for the four antenna/receiver GPS attitude determination system as shown in FIG. 1.

The present invention shall be described with reference to FIGS. 1–3. A GPS attitude determination system 10 for carrying out the fault detection and isolation method as generally shown in FIG. 2, and further in detail in the illustrative embodiment of FIG. 3, is shown in FIG. 1. The GPS attitude determination system 10 is shown illustratively in conjunction with six satellites, i.e., SVs 12, which as known to one skilled in the art, orbit the earth while providing GPS signals for use by GPS systems, such as GPS attitude determination system 10, to generate attitude information for a vehicle, such as, for example, attitude for an aircraft. However, it should be apparent to one skilled in the art that the attitude of any vehicle, such as space vehicles, land based vehicles, etc. are contemplated in accordance with the present invention.

The system 10 includes four separate antenna/receiver sets 14–17. Each of the antenna/receiver sets 14–17 include an antenna 31, 33, 35, 37, such as an omnidirectional antenna, #501 antenna available from NovAtel (Canada), a low profile antenna and preamplifier #16248–50 available from Trimble Navigation Ltd., an active antenna #AN 150 available from Canadian Marconi Company (Canada), or any other antenna suitable for receiving GPS signals from the SVs. Further, each of the antenna/receiver sets 14–17 include a GPS receiver 32, 34, 36, 38 connected to the respective antenna 31, 33, 35, 37 of the set and suitable for receiving the GPS signals from the respective antenna and for sampling such GPS signals as received. Such GPS receivers may include #MET 5000 available from NovAtel (Canada), a TANS Vector receiver available from Trimble Navigation Ltd., an ALLSTAR CMT-1200 available form Canadian Marconi Company (Canada), or any other suitable GPS receiver. Antenna/receiver set 14 includes antenna 31 (A1) and receiver 32 (R2); antenna/receiver set 15 includes antenna 33 (A2) and receiver 34 (R2); antenna/receiver set 16 includes antenna 35 (A3) and receiver 36 (R3); and antenna/receiver set 17 includes antenna 37 (A4) and receiver 38 (R4).

Each of the receivers 32, 34, 36 and 38 are provided with a clock 22 for synchronization with the clocks of the SVs to recover information from the GPS signals. The clock 22 may be a single clock provided to each GPS receiver, separate clocks provided to each GPS receiver, or one or more clocks provided to one or more receivers. Information generated by the receivers 32, 34, 36 and 38 is provided to processor system 24. Such information, for example, carrier phase measurements, are used by the processor system 24 to generate the desired output, such as attitude. The processor system 24 also controls the operation of the receivers 32, 34, 36 and 38.

The antennas 31, 33, 35, and 37 and respective receivers 32, 34, 36 and 38 may be connected to one another and other components of the system by transmission lines. For example, in an aircraft, the antennas may be remotely located at some fixed location on the wings and/or at fixed points along the body of the aircraft to define a plane for which attitude is determined. As the antennas are located remotely from the respective receivers with which they communicate, cable is typically used to provide a transmission line therebetween. The present invention is directed at detecting faults along the entire path of transmission to provide accurate GPS signals and information to the processor system 24 no matter where these faults occur, i.e, anywhere from the antenna receipt of the GPS signals to the point of application of measurement information to the processing unit 24. As such, for simplicity, the multiple antenna/receiver sets 14–17 shall be referred to hereinafter as Receivers 14–17 with the term "Receiver" hereinafter (including in the claims) referring to the entire transmission path of GPS signals and measurement information or any part thereof, including the antenna, the respectively connected receiver to the antenna, and any transmission lines connecting the antenna, receiver and processor system 24. For example, Receiver 14 includes antenna 31, receiver 32 and any transmission lines for connecting these components including connection to the processor system 24.

The processor system 24 is suitable for carrying out the detection and isolation method 50 as generally shown in FIG. 2 with respect to a varying number of Receivers and is not limited to the illustrative embodiment of four Receivers as shown in FIG. I and for which the method is described in detail in FIG. 3. Generally, the detection method 50 is applicable to any number of Receivers (Q), wherein Q is greater than three. The detection method 50 includes computing multiple attitude solutions (R) using unique subsets, i.e., groups, of (P) Receivers and GPS signals from two or more space vehicles; wherein R is also greater than three and $3 \leq P \leq Q-1$ (Block 52). For example, attitude solutions can be computed for subsets, i.e., groups, of three Receivers as shown and described in FIG. 3. If five Receivers are utilized for use in vehicle attitude determination, then ten (three Receiver) attitude solutions are possible; if four Receivers are used, then four attitude solutions are possible (see FIG. 3). Further, if six Receivers are used, then fifteen (four Receiver) attitude solutions are possible. As further described below, the attitude solutions for each group of Receivers includes the use of measurements made from multiple SVs. For example, in most cases with respect to aircraft, measurements from two or three SVs are utilized for attitude solutions. However, measurements from more than three SVs may be used.

The attitude solutions for the various groups of Receivers can be calculated in the following manner by determining the relative positions of each antenna of the group with respect to the others by using differential carrier phase measurements of the GPS signal. As previously discussed, this specification assumes that unknown phase ambiguities have been resolved in a manner known to those skilled in the art. Once the differential carrier phase measurement is calculated for each antenna of the group of Receivers relative to the other antennas of the group of Receivers, attitude solutions corresponding to each unique group of Receivers, can be determined using the algorithms described below.

For example, to illustrate the computation of attitude solutions for unique groups of Receivers, a group of three Receivers, which may include Receivers 14–16, are utilized. The receivers 32, 34, and 36 of the Receivers 14–16 are used to generate carrier phase measurements of the GPS signals received by the antennas from three SVs, such as SV 1–3. The carrier phase measurements are then used by the processor system 24 to generate the differential carrier phase measurements representative of the relative position of one of the antenna with respect to another, i.e., the antenna of Receiver 14 relative to the antenna of Receiver 15, for one of the SVs, i.e., SV 1. All the other relative positions possible between the antennas of the group of Receivers 14–16 with respect to SV1 are also determined. The differential carrier phase measurements are then determined for this same group of Receivers with respect to the other SVs, i.e., SV2–3. Following the determination of all the relative positions possible between the antennas of the group of Receivers 14–16, an attitude solution can be generated. In other words, two or more GPS satellites (i.e., SV1–3) and more than two GPS antenna (Receivers 14–16) are required for full three dimensional attitude computation with each combination of such resulting in a separate attitude solution.

Using the differential carrier phase measurements, absolute attitude can be determined in the following manner. The following equation, Equation 1, represents the relationship between the GPS differential carrier phase measurements to the GPS SV line of sight vectors. This data is transformed into the proper reference frame by the attitude direction cosine matrix $A_I^B$, which transforms inertial frame vectors into body frame vectors, i.e., the body frame vectors being the vectors fixed in the vehicle body frame which rotate with the vehicle in the inertial frame. The attitude matrix is the unknown element of the equation, as all other data is known or measurable.

$$\text{Equation 1)} \quad \Delta\Phi_{MN_t} = \frac{2\pi}{\lambda}\left\{\vec{L}_{MN_B} \cdot \left\{A_I^B\left(\frac{I_{\hat{r}_I}SV_i - I_{\hat{r}_I}B}{\left\|I_{\hat{r}_I}SV_i - I_{\hat{r}_I}B\right\|}\right)\right\}\right\}$$

where:  $\Delta\phi$    is measured *GPS* differential carrier phase measurement between two antennas, $M, N$    are any two antennas, $i$    is the *GPS* satellite index, $\vec{L}_B$    is the baseline vector between antennas in the body reference frame, $B$    is the body reference frame, $I$    is the inertial reference frame, $A_I^B$    is the attitude matrix, transforming inertial to body frame, $I_{\hat{r}_I}SV_i$    is the vector from the inertial origin to the *GPS SV* in inertial coordinates, $I_{\hat{r}_I}B$    is the vector from the inertial origin to the body in inertial coordinates, and $\lambda$    is the *GPS* signal wavelength.

The solution to this equation is determined by first assembling the measured data into appropriate arrays based upon the tracked GPS SVs, i.e., such as, for example, SV1–3, and the antennas of the group of three Receivers, i.e., such as, for example, Receivers 14–16, used for computing one of the attitude solutions.

With the ratio of the difference of the SV vector to the antenna body frame origin vector over the difference's magnitude being written as shown in Equation 2, then Equation 1 can be written as shown below in Equation 3.

$$\text{Equation 2)} \quad B_{\hat{r}_I}SV_i = \left[\frac{I_{\hat{r}_I}SV_i - I_{\hat{r}_I}B}{\left\|I_{\hat{r}_I}SV_i - I_{\hat{r}_I}B\right\|}\right]$$

where: $B_{\hat{r}_I} SV_i$ is the unit vector from the body frame origin to the GPS SV in inertial reference frame coordinates.

Equation 3)
$$\Delta \Phi_{MN_i} = \frac{2\pi}{\lambda} \{ \vec{L}_{MNB} \cdot (A_I^B \, B_{\hat{r}_I} SV_i) \}$$

$$= \frac{2\pi}{\lambda} \begin{Bmatrix} L_{MN_{Bx}} \cdot (A_{I\,11}^B B_{\hat{r}_{I_x}} SV_i + A_{I\,12}^B B_{\hat{r}_{I_y}} SV_i + A_{I\,13}^B B_{\hat{r}_{I_z}} SV_i) \\ L_{MN_{By}} \cdot (A_{I\,21}^B B_{\hat{r}_{I_x}} SV_i + A_{I\,22}^B B_{\hat{r}_{I_y}} SV_i + A_{I\,23}^B B_{\hat{r}_{I_z}} SV_i) \\ L_{MN_{Bz}} \cdot (A_{I\,31}^B B_{\hat{r}_{I_x}} SV_i + A_{I\,32}^B B_{\hat{r}_{I_y}} SV_i + A_{I\,33}^B B_{\hat{r}_{I_z}} SV_i) \end{Bmatrix}$$

It should be noted that the use of the differential carrier phase measurement in Equation 3 should not include any receiver clock error. Clock error is a result of unavoidable error in a GPS receiver's oscillator which will add directly to all measured pseudo ranges. If this clock error has not been removed in the cycle ambiguity resolution process then it should be removed before Equation 3 is used. The clock error may be resolved using any method for correcting for such errors as known to those skilled in the art. For example, the clock error may be removed by solving the standard GPS position Equation 4, then $\Delta\Phi = \Delta\Phi' - \text{clock}$.

Equation 4)
$$\begin{bmatrix} dx \\ dy \\ dz \\ \text{clock} \end{bmatrix} = k \Delta \Phi'$$

where: $\Delta\Phi'$ does not have the clock error removed, $$k = (H^T H)^{-1} H^T$$

$$H = \begin{bmatrix} B_{\hat{r}_{I_x}} SV_i & B_{\hat{r}_{I_y}} SV_i & B_{\hat{r}_{I_z}} SV_i & 1 \\ \vdots & \vdots & \vdots & \vdots \end{bmatrix}$$

Equation 3 can be written with respect to all tracked SV's and antennas, i.e., pairs of antennas of which the relationship is being determined, as Equation 5.

Equation 5)

$$\begin{bmatrix} \frac{\lambda}{2\pi} \Delta\Phi_{MNi} \\ \frac{\lambda}{2\pi} \Delta\Phi_{MNj} \\ \frac{\lambda}{2\pi} \Delta\Phi_{MNk} \\ \vdots \\ \frac{\lambda}{2\pi} \Delta\Phi_{MPi} \end{bmatrix} =$$

$$\begin{bmatrix} L_{MN_{Bx}} B_{\hat{r}_{I_x}} SV_i L_{MN_{Bx}} B_{\hat{r}_{I_y}} SV_i L_{MN_{Bx}} B_{\hat{r}_{I_z}} SV_i L_{MN_{By}} B_{\hat{r}_{I_x}} SV_i L_{MN_{By}} B_{\hat{r}_{I_y}} SV_i L_{MN_{By}} B_{\hat{r}_{I_z}} SV_i L_{MN_{Bz}} B_{\hat{r}_{I_x}} SV_i L_{MN_{Bz}} B_{\hat{r}_{I_y}} SV_i L_{MN_{Bz}} B_{\hat{r}_{I_z}} SV_i \\ L_{MN_{Bx}} B_{\hat{r}_{I_x}} SV_i L_{MN_{Bx}} B_{\hat{r}_{I_y}} SV_i L_{MN_{Bx}} B_{\hat{r}_{I_z}} SV_i L_{MN_{By}} B_{\hat{r}_{I_x}} SV_i L_{MN_{By}} B_{\hat{r}_{I_y}} SV_i L_{MN_{By}} B_{\hat{r}_{I_z}} SV_i L_{MN_{Bz}} B_{\hat{r}_{I_x}} SV_i L_{MN_{Bz}} B_{\hat{r}_{I_y}} SV_i L_{MN_{Bz}} B_{\hat{r}_{I_z}} SV_i \\ L_{MN_{Bx}} B_{\hat{r}_{I_x}} SV_i L_{MN_{Bx}} B_{\hat{r}_{I_y}} SV_i L_{MN_{Bx}} B_{\hat{r}_{I_z}} SV_i L_{MN_{By}} B_{\hat{r}_{I_x}} SV_i L_{MN_{By}} B_{\hat{r}_{I_y}} SV_i L_{MN_{By}} B_{\hat{r}_{I_z}} SV_i L_{MN_{Bz}} B_{\hat{r}_{I_x}} SV_i L_{MN_{Bz}} B_{\hat{r}_{I_y}} SV_i L_{MN_{Bz}} B_{\hat{r}_{I_z}} SV_{ii} \\ \vdots \\ L_{MN_{Bx}} B_{\hat{r}_{I_x}} SV_i L_{MN_{Bx}} B_{\hat{r}_{I_y}} SV_i L_{MN_{Bx}} B_{\hat{r}_{I_z}} SV_i L_{MN_{By}} B_{\hat{r}_{I_x}} SV_i L_{MN_{By}} B_{\hat{r}_{I_y}} SV_i L_{MN_{By}} B_{\hat{r}_{I_z}} SV_i L_{MN_{Bz}} B_{\hat{r}_{I_x}} SV_i L_{MN_{Bz}} B_{\hat{r}_{I_y}} SV_i L_{MN_{Bz}} B_{\hat{r}_{I_z}} SV_i \end{bmatrix} [A]_{9 \times 1}$$

where: $[A]_{9\times 1} = \begin{bmatrix} A^B_{I\,11} \\ A^B_{I\,21} \\ A^B_{I\,31} \\ A^B_{I\,21} \\ A^B_{I\,22} \\ A^B_{I\,23} \\ A^B_{I\,31} \\ A^B_{I\,32} \\ A^B_{I\,33} \end{bmatrix}$ and where: $[A]_{9\times 1}$ is the attitude matrix $[A]$, which has three rows and three columns written in vector form.

Therefore, Equation 1 has now been represented as a linear equation with the attitude direction cosine matrix listed as a nine element vector in Equation 5 that can be solved using the least squares method. The nine element vector in Equation 5 can then be represented using symbols as shown in Equation 6.

$$[\Delta\Phi] = [LR][A]_{9\times 1} \qquad \text{Equation 6)}$$

The solution to Equation 6 is found by forming a pseudo-inverse of the [LR] matrix such that the following Equation 7 is derived.

Equation 7) $[A]_{9\times 1} = ([LR]^T[LR])^{-1}[LR]^T[\Delta\Phi]$ where: $T$ is the matrix transpose, and -1 is the matrix inverse.

To solve for this attitude solution, a 9×9 matrix inversion is required. Equation 7, therefore, represents the solution to determine vehicle attitude based upon GPS differential carrier phase measurements and line of sight vectors to the tracked GPS SVs. Because the attitude matrix $[A]_{3\times 3}$ is a special type of matrix, particularly an orthonormal matrix, Equation 6 itself does not guarantee that a proper direction cosine matrix is formed. The matrix determined by Equation 7 should be orthonormalized such that the end result represents a proper direction cosine matrix.

In the specific case of only two GPS SVs visible and tracked by three GPS antennas, only six unique measurements are available for attitude determination. This is insufficient to solve for all nine elements of the $[A]_{9\times 1}$ matrix. In this specific case, Equation 7 is solved for only six elements of $[A]_{9\times 1}$ (the first two rows) and the remaining three elements (third row) are solved by computing a vector cross product of the first two rows to form the third row ($\vec{row}_3 = \vec{row}_1 \times \vec{row}_2$). Again the resulting 3×3 matrix should be orthonormalized to ensure it represents a proper direction cosine matrix.

Although only two GPS SVs are technically required to determine three dimensional vehicle attitude, typically three or four GPS SVs are required to determine an antenna position, $^B\vec{r}_1^{SV}$ i, by GPS only systems. In the case of an inertial navigation system, or similar navigation aid, being available, the position solution from such systems may be used as the $^B\vec{r}_1^{SV}$ i value and again only two GPS SVs are required to compute the GPS attitude solution.

In addition to computing attitude solutions using differential carrier phase measurements, absolute attitude and perturbation attitude can also be generated using other methods as described in copending U.S. patent application, entitled "Attitude Determination Method and System", filed even day herewith (Docket No. H16-16380) and hereby entirely incorporated herein by reference.

The attitude of the vehicle is described in terms of a direction cosine matrix (a nine element matrix), where this matrix is used to transform a three element vector from one reference frame to another in the above attitude solution methods. However, these equations can be similarly derived for a four parameter quaternion or Euler's angles which could also be used to represent vehicle attitude.

In conjunction with the above attitude computation description illustration of the computation of measurement residuals as shown in Block 54 is generally described. Using Equations 6 and 7, post-update measurement residuals at time K are computed by first computing $A_k$ using Equation 6 as $A_k = ([LR]_K^T[LR]_K)^{-1}[LR]_K^T \Delta\Phi_K$ where $\Delta\Phi_k$ was measured by the GPS system 10 using carrier phase measurements recovered by the receivers thereof. The computed $A_K$ can then be used to reevaluate the $\Delta\Phi$ measurement by computing $\Delta\hat{}_K$ i.e., the expected $\Delta\Phi_K$ based on the new $A_K$ solution using $\Delta\hat{}_K = [LR]K$. Then the difference $\Delta\Delta\Phi = \Delta\Phi_K - \Delta$ is the post-update measurement residual for one differential carrier phase measurement provided using the carrier phase measurements of a pair of antenna/receiver sets with respect to one SV.

In a perfect world, $\Delta\Delta\Phi$ or post update measurement residuals would be zero. Because of measurement errors that are present on $\Delta\Phi$, it is not zero and can be used in conjunction with the detection method 50 to determine and isolate the existence of one or more Receiver faults. Such post-update measurements residuals are available on a one measurement per SV and antenna pair basis. For example, if measurements from three SVs are utilized to determine one attitude solution, then generally, two separate measurement residuals are generated with respect to each SV (i.e., two measurement residuals for each SV) with six of the residuals available corresponding to each attitude solution, i.e., the six residuals representing a set of measurement residuals corresponding to an attitude solution.

A post-update measurement residual set, i.e., including the separate measurement residuals computed for each SV and antenna pair utilized in the computation of an attitude solution for a particular unique group of Receivers, is available for each attitude solution. Detection of Receiver failures (Block 56) is performed by watching the post-update measurement residual sets for "large" groups of measurement residuals as is further described below with respect to the detection method applied to the illustrative four Receiver GPS attitude system as shown in FIG. 3. However, as previously indicated, the detection method 50 can be generalized to deal with an attitude system having more than four Receivers, i.e., Q Receivers. Prior to the detailed illustration using the four Receiver system 10 of FIG. 1 and the flow diagram of FIG. 3, such generalized detection of S Receiver failures, wherein $1 \leq S \leq Q-3$, shall be generally described with respect to a generalized attitude system having Q Receivers, with Q>3, and having R attitude solutions being computed using subsets, i.e., groups, of P Receivers and signals from two or more space vehicles, wherein P=Q−S and $3 \leq P \leq Q-1$.

No matter what the number of Receivers utilized to compute the attitude solution, one set of post-update measurement residuals is determined for each of the R attitude solutions. Thereafter, detection of one Receiver fault or multiple Receiver faults is performed by comparing the R post-update measurement residual sets corresponding to the attitude solutions.

To detect single Receiver faults, in the circumstance when P is equal to Q−1, and therefore S=1, the post-update measurement residual sets are compared to determine if Q−1 of the R post-update measurement residual sets are relatively different than the other post-update measurement residual set, i.e., if the Q−1 residual sets are relatively larger than the other residual set. If such is the case, then the single Receiver fault is isolated as a common receiver used in the provision of the Q−1 attitude solutions corresponding to the Q−1 post-update measurement residual sets which are relatively larger than the other post-update measurement residual set.

Where S>1, i.e., more than one Receiver fault is to be detected, or, for example, such as P=Q−2, then generally, R attitude solutions are computed wherein R is "Q choose T" which can be represented mathematically as Q!/(T!*S!) where "!" implies the factorial operator, for example, 3! is 3*2*1=6. To illustrate such detection, several examples are given.

In an example using Q=4 Receivers, then detection of only 1 Receiver fault is allowed as shown by S=1 using the equation above. This is the single fault detection method as described above. In such a case, there are four choices of solutions each excluding one of the four Receivers in its calculations. As described further below with reference to FIG. 3, the occurrence of three relatively larger residual sets and one small residual set identifies the Receiver excluded from computations of the small residual set as the failed Receiver.

For another example, if five Receivers are utilized, Q=5, then double Receiver faults and single Receiver faults, $1 \leq S \leq 2$, can be detected. When detecting double Receiver faults in a five Receiver set then 5!/(3!*2!)=10 different attitude solutions are computed and there corresponding post-update measurement residual sets. In this case, the measurement residual sets are examined to look for nine of 10 of the residual sets to be relatively larger than the other which would identify the two Receivers excluded from attitude computations yielding the small residual set as the two failed Receivers.

When detecting single receiver faults in a five Receiver set, then 5!/(4!*1!)=5 different attitude solutions computed along with their corresponding measurement residual sets. In this case, the measurement residual sets are examined to look for four of the five residual sets to be relatively larger than the other which would identify the Receiver excluded from the attitude computation yielding the small measurement residual set as the failed Receiver.

This process can be extended for any number of available Receivers. Note, that with Q=6 Receivers, the algorithm has the ability to detect triple, double, or single failures, and when Q=7 Receivers, then it has the ability to detect quadruple, triple, double, or single failures, etc.

To quantify the size of the each set of post-update measurement residuals including measurement residuals for each SV and antenna pair available for the group of Receivers used in computing the attitude solution, the root mean square (RMS) value of the individual measurement residuals for the SVs and antenna pairs for computing a particular attitude solution is computed as shown in Equation 8. These RMS values, i.e., one for each attitude solution computed, are then used for comparison to determine faulty Receivers.

$$\text{Equation 8)} \quad \Delta\Delta\Phi_{rms} = \sqrt{\Delta\Delta\Phi_{1_{sv}}^2 + \Delta\Delta\Phi_{2_{sv}}^2 + \cdots + \Delta\Delta\Phi_{n_{sv}}^2}$$

In a typical differential carrier phase based GPS attitude determination system experiencing no unusual Receiver errors, $\Delta\Delta\Phi_{rms}$ should be less than a centimeter.

With particular reference to FIG. 3, the detection method 50 shall be described using the illustrative four receiver GPS attitude determination system 10 of FIG. 1. Further, the computation of attitude solutions 52 shall be described as being performed using differential carrier phase measurements. As shown in FIG. 3, four attitude solutions are computed corresponding to four groups of three Receivers, Groups 1–4. Three Receivers tracking at least three SVs, in this illustration SV 1–3, are used for full attitude determination. The groups, therefore, consist of Group 1 which utilizes Receivers 14, 15, and 16; Group 2 which utilizes Receivers 14, 15, and 17; Group 3 which utilizes Receivers 15, 16, and 17; and Group 4 which utilizes 14, 16 and 17.

The carrier phase measurements from each pair of Receivers of each of the Groups 1–4 with respect to each SV being tracked are utilized to provide the measurements for the computation of attitude as described previously herein. For example, Receivers 14–16 of Group 1 are used to generate carrier phase measurements of the GPS signals received by the antennas from three SVs, such as SV 1–3. The carrier phase measurements are then used by the processor system 24 to generate the differential carrier phase measurements representative of the relative position of each of the antennas of the Receivers 14–16 with respect to the other antennas of the Group 1 for one of the SVs, i.e., SV 1. The differential phase carrier measurements are also determined for this same Group 1 of Receivers 14–16 with respect to the other SVs, i.e., SV2–3. Following the determination of all the relative positions possible between the antennas of the Group 1 of Receivers 14–16, an attitude solution can be generated as previously described. In a like manner, each of the other Groups 2–4 of Receivers are used to compute corresponding separate attitude solutions.

Thereafter, as shown in the compute measurement residual Blocks 54 of FIG. 3, a post-update measurement residual value, i.e., RMS value, is computed for each of the computed attitude solutions corresponding to Groups 1–4 of Receivers. The post-update measurement residual value for each attitude solution is computed in the manner described previously. In other words, the individual measurement residuals of a set of post-update measurement residuals are used to compute an RMS value. The individual measurement residuals are computed by comparing the measured differential carrier phase with the expected differential carrier phase measurement where the expected differential carrier phase measurement is computed using Equation 6 and where the most recently computed $A_K$ from Equation 7 is used to perform a reevaluation of $\Delta\Phi$. Each of the post-update measurement residual sets correspond to an attitude solution and are used for computing the root mean square (RMS) value thereof. For example, a set of six separate measurement residuals corresponding to SV 1–3 are computed for differential carrier phase measurements associated with the three Receivers of Group 1, i.e., two residuals for each SV or one for each SV-antenna pair. It is then this set of six separate measurement residuals which are used to produce the RMS post-update measurement residual value which corresponds to the attitude solution computed using Group 1 Receivers. Likewise, RMS post-update measurement residual values corresponding to the other attitude solutions computed using Groups 2–4 Receivers are generated. Such measurements residual values may be generated simultaneously or in a multiplexed fashion.

After computation of the RMS post-update measurement residual values corresponding to the four attitude solutions, the detection method 50 proceeds to determine and isolate Receiver failures from the generated post-update measurement residual values (Block 56) as shown in FIG. 3. The determination of Receiver failures, if any, is performed by first examining the RMS post-update measurement residual values for the four Groups 1–4 of Receivers by comparing each of the post-update measurement residual values to an RMS measurement residual threshold as shown by Block 60. If all of the post-update measurement residual values do not meet the threshold requirement, which in this particular illustration means that none of the post-update measurement residual values exceed a threshold of about one centimeter, then there is determined not to be a failure and the process continues normally (Block 62 and 66). If one of the RMS post-update measurement residual values does not meet the RMS residual threshold requirement, i.e., it exceeds the threshold, then all the post-update measurement residual values are examined to determine if the RMS post-update measurement residual values corresponding to three of the Groups 1–4 of Receivers are significantly larger than the remainder Group (Block 64). If the RMS post-update measurement residual values of three of the Groups 1–4 are not significantly larger than the remainder group then it is determined that no Receiver failure (Block 66) exists. If the post-update RMS measurement residual values of three of the Groups 1–4 are significantly larger than the remainder Group, then there is determined to be a Receiver failure (Block 68).

As the RMS post-update measurement residual values of three Groups were influenced by the same common Receiver used to compute the attitude solutions, it can be determined that the common Receiver among the three Groups having significantly larger RMS post-update measurement residual values is the faulty Receiver. In other words, the Receiver not used to compute the attitude solution of the remainder Group having the smaller post-update measurement residual value is isolated as the faulty Receiver (Block 68).

Although the invention has been described with particular reference to preferred embodiments thereof, variations and modifications of the present invention can be made within a contemplated scope of the following claims as is readily known to one skilled in the art. For example, thresholds given are for illustrative purposes only, the attitude solution computations are for illustrative purposes only and other manners of computation are clearly contemplated in accordance with the present invention, and any number of Receivers and SVs may be substituted for the illustrative embodiment described with reference to FIG. 3.

What is claimed is:

1. A GPS receiver fault detection method for use in a GPS attitude determination system having Q Receivers, wherein Q>3, the method comprising the steps of:
   providing R attitude solutions using subsets of P Receivers and signals from two or more space vehicles, wherein $3 \leq P \leq Q-1$;
   determining R post-update measurement residual sets, each of the post-update measurement residual sets corresponding to one of the R attitude solutions; and
   detecting S Receiver faults by comparing the R post-update measurement residual sets, wherein $1 \leq S \leq Q-3$.

2. The method according to claim 1, wherein if P is equal to Q–1, and therefore, S=1, then the detection step includes identifying a Receiver fault if Q–1 of the R post-update measurement residual sets are relatively different than the other post-update measurement residual set.

3. The method according to claim 2, wherein the detection step further includes isolating the Receiver fault as a common receiver used in the provision of the Q–1 attitude solutions corresponding to the Q–1 post-update measurement residual sets which are relatively different than the other post-update measurement residual sets.

4. The method according to claim 3, wherein the detection step is performed only if one of the R post-update measurement residual sets does not meet a residual threshold requirement.

5. The method according to claim 1, wherein the GPS attitude determination system has four Receivers and the determination step includes providing four post-update measurement residual sets, each of the four measurement residual sets corresponding to one of four attitude solutions and each of the attitude solutions being computed using three Receivers, and further wherein the detection step includes isolating the Receiver fault as the Receiver not used in the computation of the attitude solution corresponding to the post-update measurement residual set which is relatively different than the other three post-update measurement residual sets.

6. The method according to claim 1, wherein the GPS attitude determination system has four Receivers, wherein the determination step includes providing four post-update measurement residual sets, each of the four post-update measurement residual sets corresponding to one of four attitude solutions with each of the attitude solutions being computed using three Receivers, and further wherein the detection step includes identifying a Receiver fault if three of the four post-update measurement residual sets are relatively larger than the other post-update measurement residual set with the Receiver fault being isolated to the Receiver excluded from use in the computation of the attitude solution corresponding to the other post-update measurement residual set.

7. The method according to claim 6, wherein the identification step is performed only if one of the four post-update measurement residual sets exceeds a measurement residual threshold.

8. The method according to claim 1, wherein the determination step includes the step of determining separate measurement residuals of the sets, the separate measurement residuals associated with the space vehicle and Receiver pairs used for computing each of the four or more attitude solutions, a post-update measurement residual value corresponding to one of the attitude solutions is computed by taking the root mean square value of the separate measurement residuals associated with the space vehicles and Receiver pairs used in providing the corresponding attitude solution.

9. A GPS receiver fault detection method for use in aGPS attitude determination system having Q Receivers, wherein Q>3, the method comprising the steps of:

providing R attitude solutions using subsets of P Receivers and signals from two or more space vehicles, wherein $3 \leq P \leq Q-1$;

determining R post-update measurement residual values, each of the post-update measurement residual value corresponding to one of the R attitude solutions; and comparing each of the R post-update measurement residual values to a measurement residual threshold to determine a potential existence of a faulty Receiver.

10. A receiver fault detection system for use in determining a Receiver fault during GPS attitude determination, the system comprising:

Q Receivers for receiving signals from at least two space vehicles, wherein Q>3; and processing means for isolating S faulty Receivers, wherein $1 \leq S \leq Q-3$, the processing means including:

means for computing R attitude solutions, each of the attitude solutions computed using signals received at subsets of P Receivers from the two or more space vehicles, wherein $3 \leq P \leq Q-1$;

means for calculating R post-update measurement residual values, each of the post-update measurement residual values corresponding to one of the R attitude solutions; and detection means for comparing the R post-update measurement residual values to detect the S faulty Receivers.

11. The system according to claim 10, wherein if P is equal to Q-1, and therefore S=1, then the detection means includes means for identifying a Receiver fault if Q-1 of the R post-update measurement residual sets are relatively different than the other post-update measurement residual set.

12. The system according to claim 11, wherein the identification means includes isolation means for identifying the faulty Receiver as a common Receiver used by the computation means in computing the Q-1 attitude solutions corresponding to the Q-1 post-update measurement residual values which are relatively different than the other post-update measurement residual value.

13. The system according to claim 10, wherein the processing means further includes means for controlling the detection means such that comparing of the R post-update measurement residual values is performed only if one of the R post-update measurement residual values does not meet a measurement residual threshold requirement.

14. The system according to claim 10, wherein the system includes four Receivers and the computation means computes four post-update measurement residual values, each of the four measurement residual values corresponding to one of four attitude solutions, and further wherein the detection means includes isolation means for identifying the faulty Receiver as the Receiver not used in the computation of the attitude solution corresponding to the post-update measurement residual value which is relatively different than the other three post-update measurement residual values.

15. The system according to claim 10, wherein the system includes four Receivers and the computation means computes four post-update measurement residual values, each of the four post-update measurement residual values corresponding to one of four attitude solutions, and further wherein the detection means includes means for isolating the faulty Receiver if three of the four post-update measurement residual values are relatively larger than the other post-update measurement residual value with the faulty Receiver being identified as the Receiver excluded from use in computing the attitude solution corresponding to the other post-update measurement residual value.

16. The system according to claim 15, wherein the processing means further includes means for controlling the detection means such that comparing of the four post-update measurement residual values to isolate one of the four or more Receivers as the faulty Receiver is performed only if one of the four post-update measurement residual values exceeds a measurement residual threshold.

17. The system according to claim 10, wherein the calculation means includes:

means for determining separate measurement residuals associated with each space vehicle used and Receiver pair for computing the four or more attitude solutions; and means for generating each post-update measurement residual value corresponding to each attitude solution by determining a root mean square value using the separate measurement residuals associated with particular space vehicles used in computing the attitude solution corresponding to the post-update measurement residual value being generated.

* * * * *